(12) United States Patent
Peisa et al.

(10) Patent No.: US 9,924,420 B2
(45) Date of Patent: *Mar. 20, 2018

(54) METHODS AND ARRANGEMENTS IN A MOBILE TELECOMMUNICATION SYSTEM

(71) Applicant: Telefonaktiebolaget LM Ericsson (publ), Stockholm (SE)

(72) Inventors: Janne Peisa, Espoo (FI); Tao Cui, Stockholm (SE); Ingrid Nordstrand, Sundbyberg (SE); Mats Sågfors, Kyrkslatt (FI); Sven Ekemark, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,650

(22) Filed: Dec. 20, 2016

(65) Prior Publication Data

US 2017/0105151 A1 Apr. 13, 2017

Related U.S. Application Data

(63) Continuation of application No. 14/607,584, filed on Jan. 28, 2015, now Pat. No. 9,532,279, which is a
(Continued)

(51) Int. Cl.
*H04W 36/00* (2009.01)
*H04W 8/24* (2009.01)
(Continued)

(52) U.S. Cl.
CPC ....... *H04W 36/0072* (2013.01); *H04W 8/245* (2013.01); *H04W 88/02* (2013.01); *H04W 88/08* (2013.01)

(58) Field of Classification Search
CPC ............... H04W 36/08; H04W 76/046; H04W 36/0005; H04W 36/0072; H04W 36/0083;
(Continued)

(56) References Cited

U.S. PATENT DOCUMENTS 8,971,891 B2 * 3/2015 Peisa ............... H04W 8/245
455/436
9,532,279 B2 * 12/2016 Peisa ............... H04W 8/245
(Continued)

FOREIGN PATENT DOCUMENTS

EP 1 292 169 9/2002
RU 2006123077 12/2009

OTHER PUBLICATIONS

3GPP TSG-RAN WG2 Meeting #67; Shenzhen, China; Agenda Hem 6.7.1; Title: Backward Compatibility of RRC Reconfiguration During HO (R2-094567) (Aug. 24-Aug. 28, 2009).
(Continued)

*Primary Examiner* — Kwasi Karikari
(74) *Attorney, Agent, or Firm* — Baker Botts LLP

(57) ABSTRACT

Methods and arrangements in a base station and a User Equipment are provided. The methods and arrangements relates to the scenario when the UE is handed over from a source base station to a target base station in a handover scenario, and wherein the target base station may not support functionalities which the source base station and the UE support. The method in the UE comprises receiving (501) a configuration message from the target base station via the source base station, configuring (502) the UE based on the received configuration message from the target base station by searching (503) for a second field in an information element of the received configuration message. The presence/non-presence or a value of the second field is indicative of how to manage a configured first functionality associated
(Continued)

with an optional first field, wherein the configured first functionality may not be supported by the target base station.

19 Claims, 6 Drawing Sheets

Related U.S. Application Data continuation of application No. 13/497,838, filed as application No. PCT/SE2010/050611 on Jun. 3, 2010, now Pat. No. 8,971,891.

(60) Provisional application No. 61/247,034, filed on Sep. 30, 2009.

(51) Int. Cl.
*H04W 88/02* (2009.01)
*H04W 88/08* (2009.01)

(58) Field of Classification Search
CPC ............ H04W 36/0061; H04W 76/02; H04W 76/028; H04W 92/02; H04W 36/06; H04W 36/16; H04W 88/18; H04L 5/00; H04L 5/0035
See application file for complete search history.

(56) References Cited

U.S. PATENT DOCUMENTS

| 2008/0161000 | A1 | 7/2008 | Li | |
| 2008/0188224 | A1* | 8/2008 | Pani | H04W 36/02 |
| | | | | 455/436 |
| 2008/0273496 | A1 | 11/2008 | Wu | |
| 2012/0178456 | A1 | 7/2012 | Peisa | |

OTHER PUBLICATIONS

International Search Report for PCT/SE2010/050611 (dated Oct. 14, 2010).
Written Opinion for PCT/SE2010/050611 (dated Oct. 14, 2010).
International Preliminary Report on Patentability for PCT/SE2010/050611 (dated Oct. 31, 2011).
Alcatel-Lucent: "Backward Compatibility of RRC Reconfiguration During HO" 3GPP Draft, pp. 1-2 (Aug. 27, 2009).
Ericsson: "Optionality of IEs in RadioResourceConfigCommon", 3GPP Draft, p. 1, paragraph 1, p. 3, para 2 (Nov. 3, 2008).
Russian Decision to Grant for Application No. 2012117732/07 (026783); date of filing Jun. 3, 2010 (Nov. 5, 2014).
NEC: "Specification of Conditional Inclusions in Handover Preparation Container" 3GPP Draft 4, 2008 pp. 1-3 (Nov. 4, 2008).
First Office Action issued by the State Intellectual Property Office, P.R. China for Patent Application No. 201080045145.3 (with English translation) (dated Mar. 31, 2014).

* cited by examiner

METHODS AND ARRANGEMENTS IN A MOBILE TELECOMMUNICATION SYSTEM

Priority

This application is a continuation, under 35 U.S.C. § 120, of U.S. application Ser. No. 14/607,584 which is a continuation, under 35 U.S.C. § 120, of U.S. application Ser. No. 13/497,838, filed Mar. 23, 2012, which is a U.S. National Stage Filing under 35 U.S.C. § 371 of International Patent Application Serial No. of PCT/SE2010/050611 filed Jun. 3, 2010; which claims the benefit, under 35 U.S.C. § 119(a), of U.S. Provisional Application Ser. No. 61/247,034, filed Sep. 30, 2009, all of which are incorporated herein by reference.

TECHNICAL FIELD

The present invention relates to methods and arrangements in a telecommunication system, in particular to methods and arrangements for use in networks comprising base stations, wherein the base stations may have different radio resource control capabilities.

BACKGROUND

The Radio Resource Control (RRC) protocol in the 3GPP Long Term Evolution (LTE), also referred to as Evolved UTRAN (E-UTRAN), is the signaling protocol for configuring and re-configuring the radio interface configuration of User Equipments (UEs), also called mobile terminals. The protocol is disclosed in the technical specification document 3GPP TS 36,331.

The first release, Rel-8, of RRC (described in 3GPP TS 36.331) of LTE deploys a solution where fields in Information Elements (IEs) can be omitted from a message. An IE consists of fields. Each field comprises individual content or a further IE which in turn comprises fields or further IE. In addition one message comprises a plurality of IEs as illustrated in FIG. 1. In the technical specification document 3GPP TS 36.331 the IE and the field arc defined as follows:

Information element: A structural element containing a single or multiple fields is referred as information element.

Field: The individual contents of an information element are referred as fields.

The use of the fields in the IEs may be optional. If a field in an IE is optional, the UE behavior is typically specified for the case where that field is absent. One motivation for defining optional fields in messages is to reduce or minimize the size of the signaling messages. A typical situation is the case when only parts of the User Equipment (UE) configuration are changed with a message whereas most of the UE configuration remains unchanged. Thus, it is often specified that a terminal shall continue with a specific function when the related field, which is optional in the message in question, is not present in a received message.

An example of optional field is illustrated below where an IE comprising a plurality fields is disclosed. The Channel Quality Indication (CQI) is configured with an Information Element called CQI-ReportConfig:

```
CQI-ReportConfig ::=    SEQUENCE {
   cqi-ReportModeAperiodicENUMERATED {
                   rm12,rm20,rm22,rm30,rm31,
                      spare3,spare2,spare1} OPTIONAL --
                      Need OR
   nomPDSCH-RS-EPRE-Offset   INTEGER (–1..6),
```

-continued

```
   cqi-ReportPeriodic   CQI-ReportPeriodic OPTIONAL - Need ON
}
```

Within this IE, both cqi_ReportModeAperiodic and cqi-ReportPeriodic are both optional fields, which is indicated with the syntax OPTIONAL above.

Therefore the UE behavior has to be specified when the optional parameters are absent. This can be done by using the tags "Need OR" and "Need ON", respectively, which specifies the UE behavior when the optional parameters are not present. Need OR means that in case the information element is absent from a message, then the UE should stop using/discontinue or delete any existing configuration or values that would otherwise be configured if the information element would be present. In contrast, with the tag Need ON, the absence of the information element means that the UE should continue to use the already existing values and associated functionality. Hereafter, the behaviour where the UE should keep the configuration and related functionality without changing any parameters at times when an optional field is missing, is called "Optional Continue".

Also other conditions and functional behavior may be explicitly specified in the specification procedures, i.e. different behaviors can be specified when an optional field is missing from a relevant message. For instance, also the IE CQI-ReportConfig is OPTIONAL in the IE PhysicalConfigDedicated. The IE PhysicalConfigDedicated is in turn "Optional Continue" in IE RadioResourceConfigDedicated, which in turn is optional in the message RRCConnectionReconfiguration. RRCConnectionReconfiguration is the message sent from EUTRAN to a UE for configuring and re-configuring functionality and related parameters in a UE. Thus, the solution for "Optional Continue" is used in the specification such that only those fields of relevance for the desired reconfiguration need to be included in the IE of the message.

The aforementioned solution using "optional continue" is used, e.g., in intra-LTE mobility. This is also illustrated in FIG. 2. In the following, for the case that a handover of a mobile terminal occurs from a first cell to a second cell, the first cell is denoted the Source Cell and the second cell is denoted the Target Cell. Similarly, where cells are controlled by different base-stations, this is denoted Source eNB and Target eNB, respectively. The eNBs are also referred to as base stations in this specification. The desire is to exchange only small messages between the UE and eNBs at handover. It can be assumed that many of the functionalities used in the Source Cell will remain unchanged in the Target Cell, and it would therefore be unnecessary to reconfigure all functionalities in the Target Cell.

Hence if the handover occurs between different eNBs, i.e. from a Source eNB to a Target eNB, the Source eNB sends the full UE configuration to the Target eNB at the preparation for the handover. The HANDOVER REQUEST message from the source eNB contains the RRC Context which includes the RRC HandoverPreparationInformation message as defined in 3GPP TS 36.331. The Target eNB may now, after decoding the received Access Stratum Context, decide which parts of the UE configuration it finds acceptable without change, and which parts should be reconfigured. For example, it is likely that nearby base-stations operated by the same operator and possibly manufactured by a single vendor prefer the same parameters that describe periodic CQI reporting. In such a case, there is no need for the Target eNB to send any updated configuration to the UE, since the Target readily accepts this part of the present UE configuration. However, if it happens that the Target eNB implements a e.g. a different Random Access configuration compared to Source eNB, it may happen that Target needs to update some Random Access parameters of relevance in the UE.

Subsequently, the Target eNB sends in the HANDOVER REQUEST ACKNOWLEDGE a "Handover Command" using a RRCConnectionReconfiguration message, which now may include fields that are "Optional Continue", such that the UE keeps its current configurations to these parts if the corresponding fields are missing. It is thus possible to create a flexible protocol that allows for reconfigurations, but where small message sizes can be provided in case only specific parts of the configurable parts are reconfigured. Specifically, the solution is also applied at handover.

3GPP protocols are published in different releases. Functionality can be changed between protocol releases and it is typical that new, enhanced functionality is added into new protocol releases. For instance, after that Rel-8 of the E-UTRAN protocols is considered to be functionally stable, future changes will be added into Rel-9, Rel-10, and so on.

Typically, it is not possible to add non-backwards compatible functionality and protocol extensions to a stable protocol, since that could result in malfunctioning of UEs and nodes already out in the field that does not support such amendments. RRC is implemented using Abstract Syntax Notation One (ASN.1) by which messages can be extended in new releases. Such extensions typically include parameters of relevance for the functionality that is added in the later release. Both "non-critical" and "critical" extensions can be added.

A critical extension implies that a receiver of an earlier release of such an extension will not understand the content of the message. For example, if a Rel-9 eNB sends a Rel-9 message to a Rel-8 UE, where the message includes a critical extension, then the UE may fail to decode the message.

A non-critical extension has the characteristic that a receiver of an earlier release may ignore the non-critical extension, but the receiver may still successfully decode the parts of the message that complies with the earlier release. For example, if a Rel-9 eNB would send a message to a Rel-8 UE, where the message includes a non-critical extension, then the UE may still decode the parts of the message that follows the Rel-8 syntax. RRC Rel-8 includes placeholders in the messages and relevant IEs for such non-critical extensions. This has been done in order to prepare for the extendibility of the RRC protocol.

It has been noted that the "optional continue" can cause a problem at handover for those cases where Source eNB and Target eNB implement different protocol release versions. Suppose that the Target eNB implements a protocol and functionality specified in Rel-8. Assume further that the Source eNB implements a later release with additional functionality, e.g. Rel-9. It is further assumed that the added functionality in the Rel-9 RRC protocol is added by using protocol extensions and that the UE is configured with the features associated with the new Rel-9 features. One problem related to this scenario occurs if the aforementioned new information elements or fields in a later release (e.g. Rel-9) are added using critical extensions, i.e. the source eNB sends a Rel-9 HandoverPreparationInformation message to the Target eNB, since the exemplified Rel-8 Target eNB may fail to decode the Access Stratum Context message received in the handover preparation message. In such a case, the Target eNB may have to send a complete re-configuration message to the UE in the "handover command", as the Target is unable to decode the configuration of the UE, i.e. Target eNB does not know what configuration the UE currently has. Thus, "Optional Continue" would be impossible for the eNB of the previous release, and large handover messages would be needed. Another related problem occurs if the aforementioned new information elements or fields in a later release (e.g. Rel-9) are added using non-critical extensions. In this case, the exemplified Rel-8 Target eNB supporting a previous release may successfully decode the parameters included in the previous release. However, the Target eNB will not understand the encoding of the later release fields, and it would have to ignore those fields. Thus, those fields would not be present in the "handover command", since the Target eNB would not know how to encode such fields.

The problem occurs in the later-release (e.g. Rel-9) UE that receives the "handover command". If the principle of "Optional Continue" was to be implemented for the new fields, then the UE should continue using the configured later-release features after handover without any change. However, in the example, the non-presence of these new fields was due to the fact that the Target eNB did not comprehend those fields, and the Target eNB does clearly not support the later release protocol features. Thus, a mismatch could occur, where the UE continues using functionality that the Target eNB does not implement, and severe protocol and functional errors could occur, since the communicating peer entities (UE and Target eNB) would assume different configurations.

SUMMARY

Consequently, none of the above described prior art solutions offer the possibility to support the feature "Optional Continue" for new functionality added in a later release, or the possibility for an earlier release Target eNB to implement "optional continue" when the Target eNB receives a configuration including fields of a later release that the Target eNB does not comprehend in part or completely. As indicated above "Optional Continue" implies that the UE should keep configuration and related functionality associated with a later release without changing any parameters at times when an optional field related to that functionality is missing.

It is therefore the purpose of the present invention to solve the aforementioned problems, and in particular, to provide a solution where the feature "Optional Continue" can be implemented for added protocol extensions in future releases of a signaling protocol, such that a user equipment can implement both "optional continue" and "discontinue, release" in the absence of the aforementioned protocol extensions in an eNB which the UE is connected to or is about to be connected to.

According to a first aspect, a method in a base station is provided. The base station is suitable for configuring a UE in a handover scenario, when the UE is handed over from a source base station to the base station and wherein the base station does not support at least one functionality which the source base station and the UE support. In the method, a HO request message is received from the source base station comprising at least a first field associated with a first functionality not supported by the base station. At least a portion of the received HO request message is decoded. Further, a reconfiguration message to be used to configure the UE to be handed over to the base station is composed.

The composing comprises omitting insertion of the at least the first field, and inserting a second field. The second field being indicative of how the UE should be configured in relation to the first functionality, and the composed reconfiguration message is sent to the UE via the source base station.

According to a second aspect of the present invention a method in a UE is provided. The UE is configured to be handed over from a source base station to a target base station in a handover scenario, wherein the target base station may not support functionalities which the source base station and the UE support. In the method, a configuration message is received from the target base station via the source base station, and the UE is configured based on the received configuration message from the target base station. The configuration is achieved by searching for a second field in an information element of the received configuration message. The presence/non-presence or a value of the second field is indicative of how to manage a configured first functionality associated with an optional first field, wherein the configured first functionality may not be supported by the target base station.

According to a third aspect of the present invention, a base station for configuring a UE in a handover scenario is provided. In the handover scenario, the UE is handed over from a source base station to the base station, wherein the base station is configured to not support at least one functionality which the source base station and the UE support. The base station comprises a receiver configured to receive from the source base station a HO request message comprising at least a first field of associated with a first functionality not supported by the base station and a decoder configured to decode at least a portion of the received HO request message. The base station further comprises a processor configured to compose a reconfiguration message to be used to configure the UE to be handed over to the base station. The processor is further configured to omit insertion of the at least the first field, and to insert a second field wherein the second field being indicative of how the UE should be configured in relation to the first functionality. The base station further comprises a transmitter for sending the composed reconfiguration message to the UE via the source base station.

According to a fourth aspect of the present invention, a UE configured to be handed over from a source base station to a target base station in a handover scenario is provided. The target base station may not support functions which the source base station and the UE support. The UE comprises a receiver configured to receive a configuration message from the target base station via the source base station. Further, the UE comprises a processor configured to search for a second field in an information element of the received configuration message. The presence/non-presence or a value of the second field is indicative of how to manage a configured first functionality associated with an optional first field, wherein the configured first functionality may not be supported by the target base station.

An advantage of embodiments of the present invention is that they make it possible to implement "Optional Continue" for configurations associated with optional fields, when the optional fields are absent, wherein the optional fields are related to said configurations such that small messages can be supported.

At the same time, it is possible to implement yet another case, i.e. that the receiver disables the associated features at times of non-presence of the optional fields, where the non-presence may be caused by the fact that the transmitter supports a previous release of the protocol, where the optional fields and related functionality are not yet supported.

Thus, embodiments of present invention allow small reconfiguration messages in future protocol releases and support compatibility between nodes in a heterogeneous network with nodes supporting different releases.

Other objects, advantages and novel features of the invention will become apparent from the following detailed description of the invention when considered in conjunction with the accompanying drawings.

DETAILED DESCRIPTION

Figure 1:
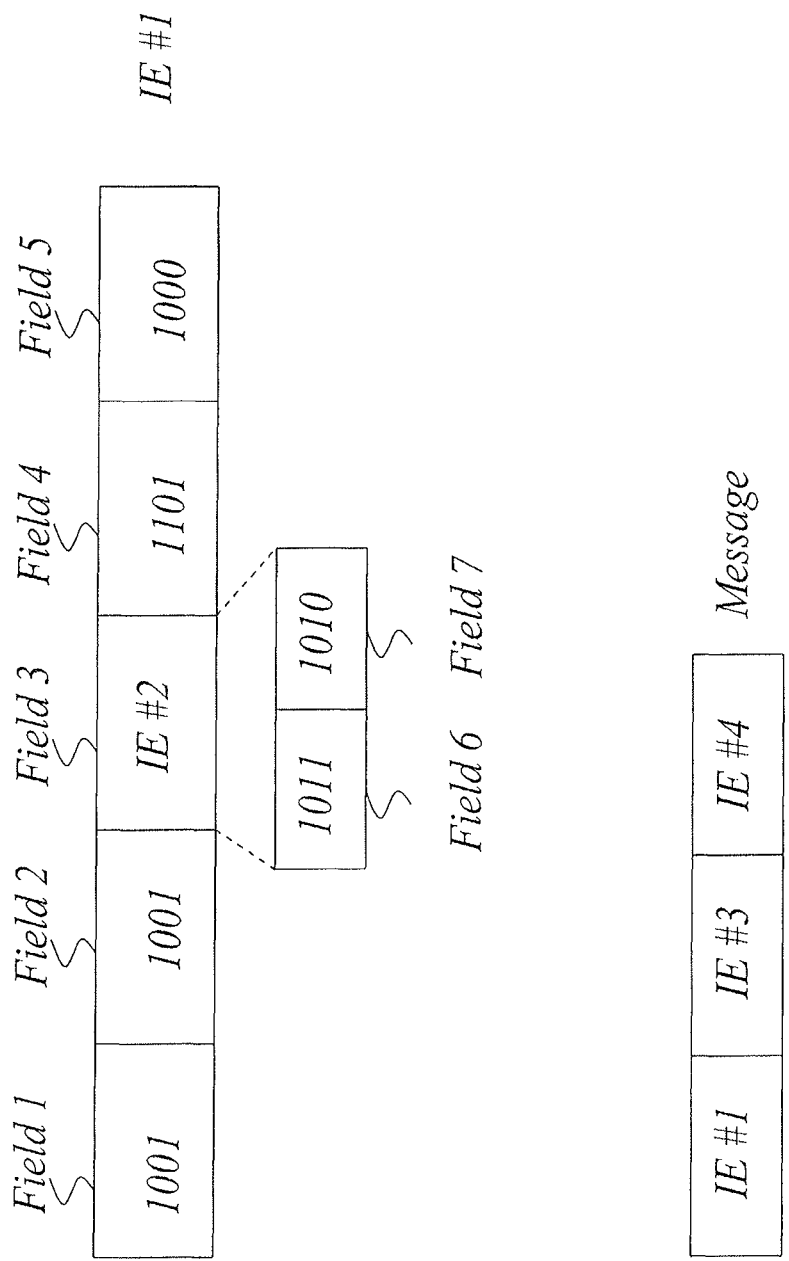
FIG. 1 illustrates a message comprising information elements according to prior art.
Figure 2:
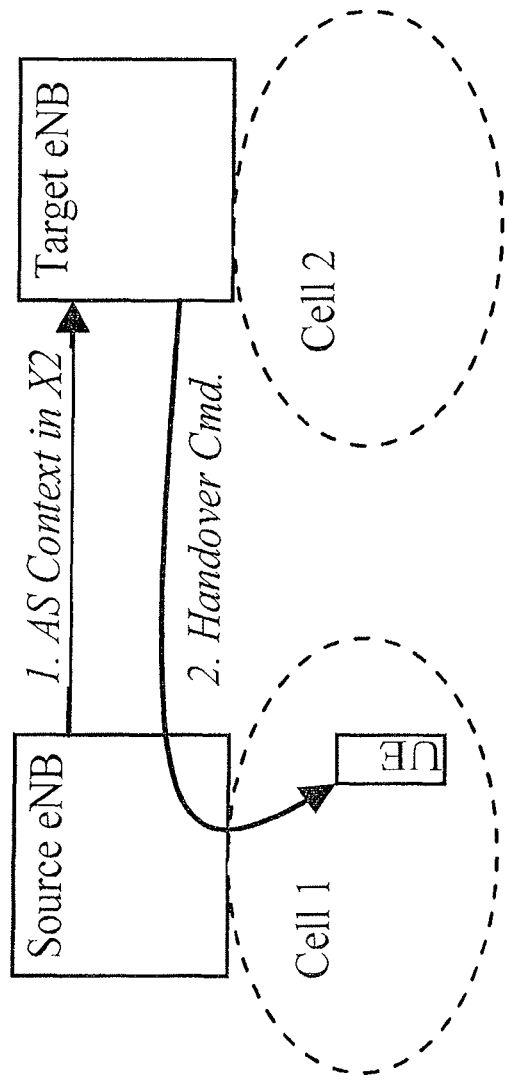
FIG. 2 illustrates a mobility scenario according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the present invention is primarily described in the form of methods and devices, the invention may also be embodied in a computer program product as well as a system comprising a computer processor and a memory coupled to the processor, wherein the memory is encoded with one or more programs that may perform the functions disclosed herein.

It should be noted that the embodiments of the present invention will be described in the context of an LTE network, but it should be noted that the invention is applicable in any system having base stations of different releases.

The following detailed description describes embodiments of the present invention illustrated by means of specific examples. In the examples it is assumed that a handover of a User Equipment (UE) shall be executed from a first base station to a second base station also referred to source base station and target base station, respectively. It should also be noted that the base stations are referred to as eNBs as the embodiments below are described in conjunction with LTE. The first eNB comprises at least a functionality supporting a certain UE configuration which is not comprised in the second eNB. In the description below this is described as the first eNB is of later release than the second eNB. The later release is exemplified as LTE Rel-9 and the release of the second eNB is exemplified as LTE Rel-8. Further, the UE is configured with new functionality which is not supported in LTE Rel-8. The new functionality is associated with a first field of an Information Element (IE) of a message according to the Rel-9 signaling protocol. The new functionality may also be characterized by multiple such first fields of an Information Element of a message. It should be understood that the example is equally valid to any scenario, where the Source eNB and the UE support functionality not yet supported by the Target eNB.

Examples of the new functionalities are channel quality indication (CQI) reporting features, timer handling, carrier aggregation, enhanced DRX, relaying, coordinated multi-point transmission and reception, and any other feature that may be included in a future release of the protocol.

Figure 3:
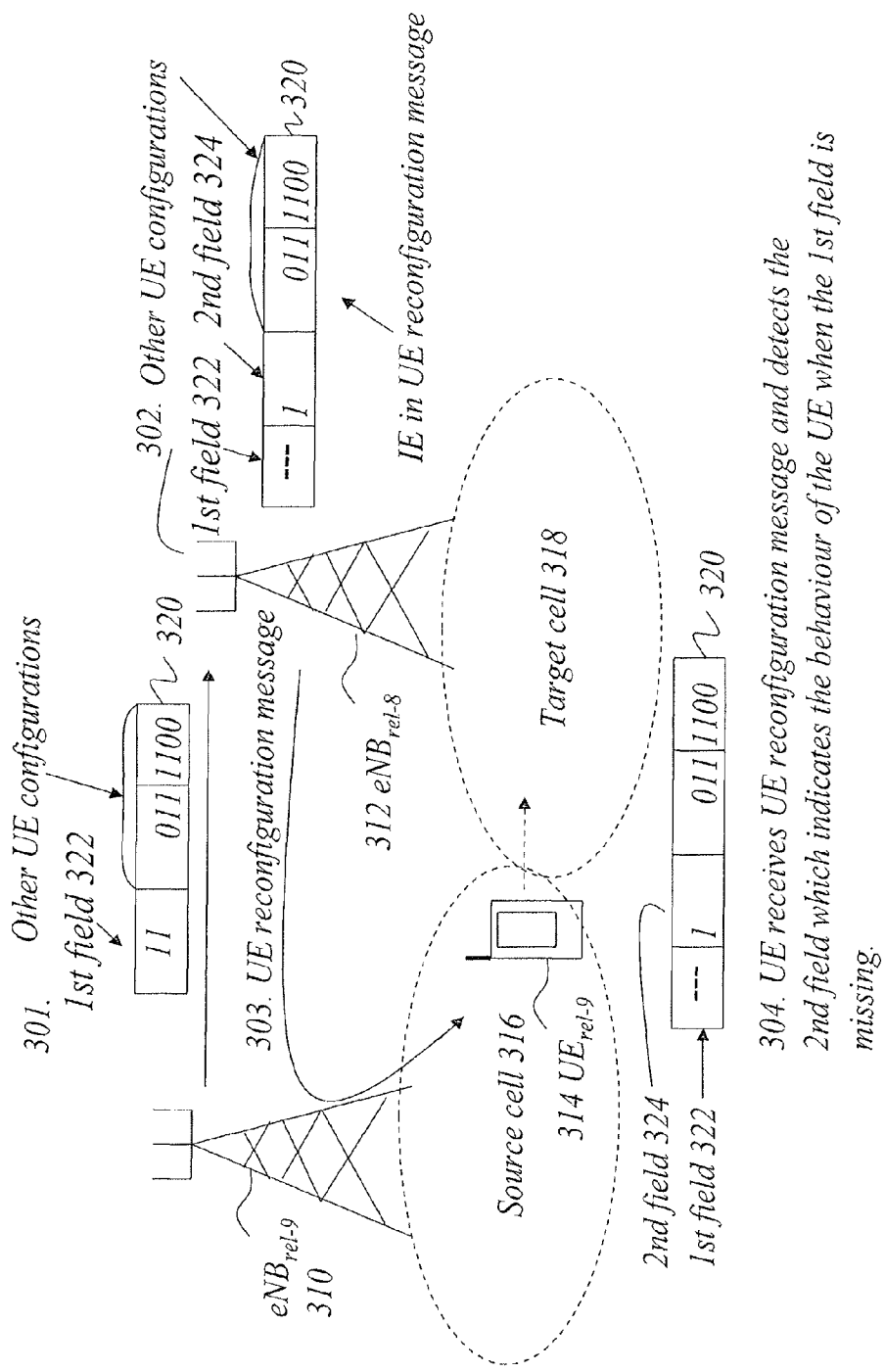
FIG. 3 illustrates a mobility scenario.

According to embodiments of the present invention with reference to FIG. 3, the Source eNB 310 sends 301 a message 330 to the Target eNB 312, where the message 330 comprises an information element (IE) 320 which in turn comprises a first field 322 related to a UE configuration supported by the Source eNB 310 but not supported by the Target eNB 312. The IE 320 further comprises other UE configurations supported by both the Source and the Target eNB. In this example, the first field is encoded as non-critical release 9 extensions. The UE configuration is typically tunneled or embedded in a "Handover Request" message from the Source eNB 310 to the Target eNB 312. The Target eNB 312 is able to decode the message, except the non-critical extensions, which the Target eNB 312 ignores. Since the Target eNB 312 does not support the UE configuration associated with the first field the Target eNB 312 omits the first field when creating 302 the reconfiguration message to be sent to the UE 314 via the Source eNB 310. Instead, the Target eNB may add a flag or another indication in a second field where it is indicated that the Target eNB does not support the UE configuration which is supported by the UEs and eNBs of later releases by e.g. telling the UE to stop using that UE configuration.

According to further embodiments the Target eNB indicates to the UE in the second field the current release which is supported by the target base station and/or the RRC functionalities that the target base station supports.

Subsequently, the Target eNB 312 now sends 303 a handover command using, e.g., an RRCConnectionReconfiguration message, where this message is encoded according to the release supported by the Target eNB 312. This RRC Connection reconfiguration message is addressed to the UE, and it is typically tunneled or embedded in a Handover Confirm message from the Target eNB to the Source eNB. The Reconfiguration message is typically passed unmodified, i.e. transparently, via the Source cNB. Thus, it is the Target eNB that takes the responsibility for configuring the UE in a way that is suitable for the Target eNB, once the Handover is completed.

Hence, the message received at the UE does not include the first field related to the configuration not supported by the Target eNB. According to the present invention the UE detects 304 the flag of the second field and then the UE understands that the UE should release that configuration if the first field is omitted. Since the UE supports the later release of the protocol compared to the Target eNB, the UE will know from the standard description how to behave with the aforementioned later-release feature when the flag of the second field is included in the Handover message.

From a UE perspective, the UE does not know which release the Target eNB supports. According to an embodiment of the present invention, the UE can distinguish between the following two cases if the first field would be omitted in a reconfiguration message:

(1) The Target eNB requests the UE to continue with the UE configuration associated with the omitted field.;

(2) The Target eNB, does not support the UE configuration associated with the omitted field, and instructs accordingly the UE should stop using that UE configuration.

In said method according to embodiments of the present invention, the UE receives the reconfiguration message e.g. in the handover command that does not include the first field related to the new functionality. The first field is thus encoded as optional. However, in order to deduce what actions the UE should take now, when the first field is not present, the UE checks the presence or a value of a second field. This second field is typically also encoded as optional.

If said second field is present or has a specific value, the UE takes a first action in relation to the functionality associated with the fields related to the new functionality. If said second field is not present or has another specific value, the UE takes a second action in relation to the new functionality associated with the fields: As an example of a first action in case the second field is present, which indicates that the Target eNB does not support the associated UE configuration, the UE may be configured to discontinue with the associated UE configuration. This may imply that a parameter fullConfig is inserted in the second field. As an example of a second action in case the second field is not present, which indicates that the Target eNB does support the associated functionality, the UE is configured to continue using the functionality associated with the first field.

The second field above may be included in the same IE or in a different IE as the first field associated with the functionality which the target base station may not support. An example of an IE where the second field can be included is the MobilityControl IE in the RRC protocol. The aforementioned searching performed by the UE of the presence or value of the second field upon detection that the first field is missing may be performed at handover, i.e. that the UE decides between taking the first or the second action only if the message is a message that triggers a handover. Thus, the MobilityControl IE is one conceivable example of where the second field could be included, and it should be understood that in other embodiments any IE in the HO command, which is not directly associated with the new functionality in question could be used. As explained above, the indication in the second field could be an indication to the UE to continue with previously configured functionality within a certain set of new functionality, if the corresponding configuration information is absent in the HO command, i.e. when the first field is omitted. Such a set of new functionality could be defined as the new functionality introduced within a specific release of the specification or a more specifically defined group of functionality. For example, if a UE is configured according to a release N+4, but the target eNB only supports release N+2, the new functionality introduced in every release could be grouped, such that the UE, depending on the value or presence of the second field, is instructed to continue with parts of the new functionality, and discontinue with parts of other new functionality. In this example, the UE could be instructed to discontinue the use of any functionality introduced after release N+2, but to continue with all new functionality introduced before N+2. Thus, new functionality that is subject to the aforementioned evaluation in the UE could be grouped in every release. This indication could be realized with a separate second field per release, or with a second field that can take multiple values.

To summarize a method in a base station according to embodiments of the present invention is provided. The base station is configured to act as a target base station in a handover scenario, when a UE is handed over from a source base station to the target base station and wherein the target base station does not support at least one function which the source base station and the UE support.

Figure 4:
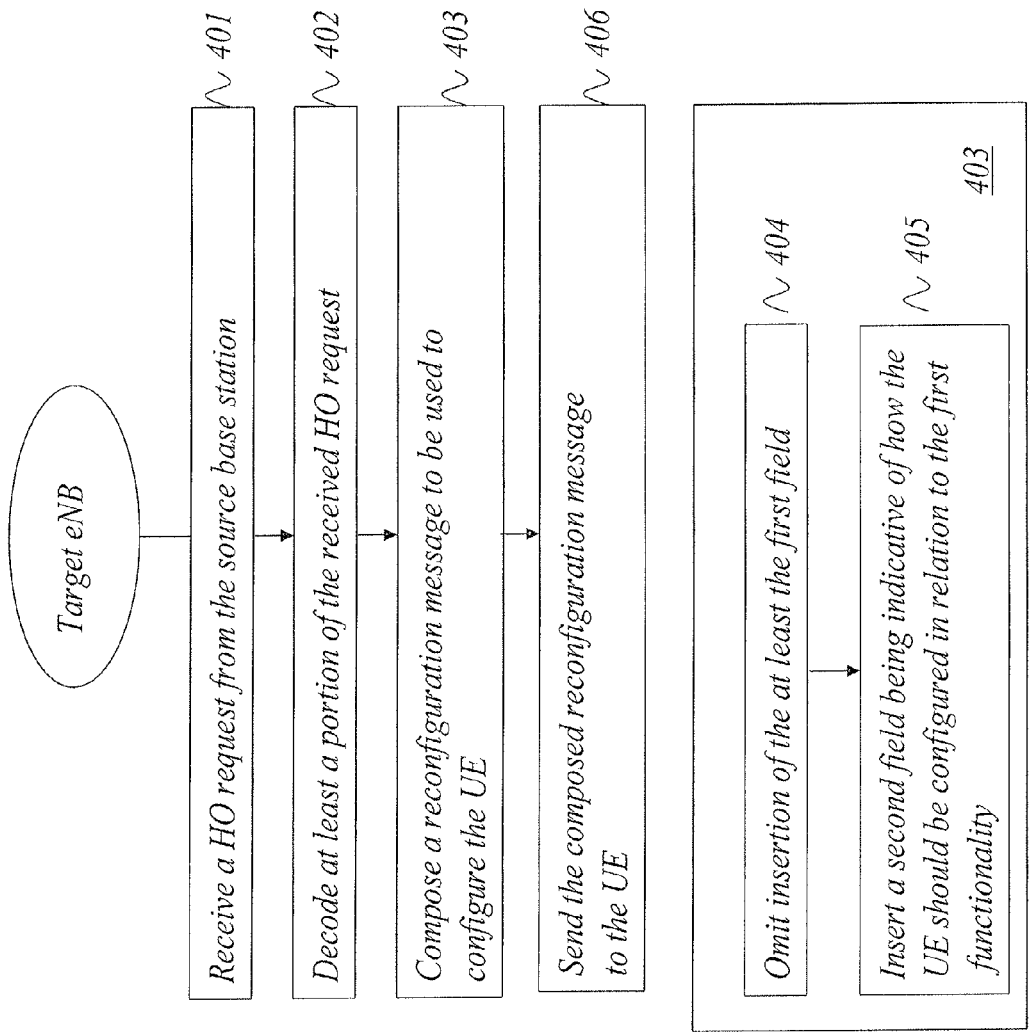
FIGS. 4 and 5 illustrate flowcharts of methods according to embodiments of the present invention.

As illustrated in FIG. 4, a HO request message is received 401 from the source base station comprising at least a first field of an information element associated with a first functionality, e.g. an RRC functionality, not supported by the target base station. The Target base station decodes 402 at least a portion of the received HO request message, and composes 403 a reconfiguration message to be used to configure the UE to be handed over to the target base station. The composing 403 comprises omitting 404 insertion of the at least the first field, and inserting 405 a second field. The second field indicates how the UE should be configured in relation to the first functionality. The base station then sends 406 the composed reconfiguration message to the UE via the source base station.

According to an embodiment of the present invention, the indication in the second field how the UE should be configured in relation to the first functionality indicates to the UE to discontinue using the first functionality not being supported by the target base station. Another possibility is that the indication in the second field indicates to the UE the current release which is supported by the target base station and/or the functionalities that the target base station supports.

Figure 5:
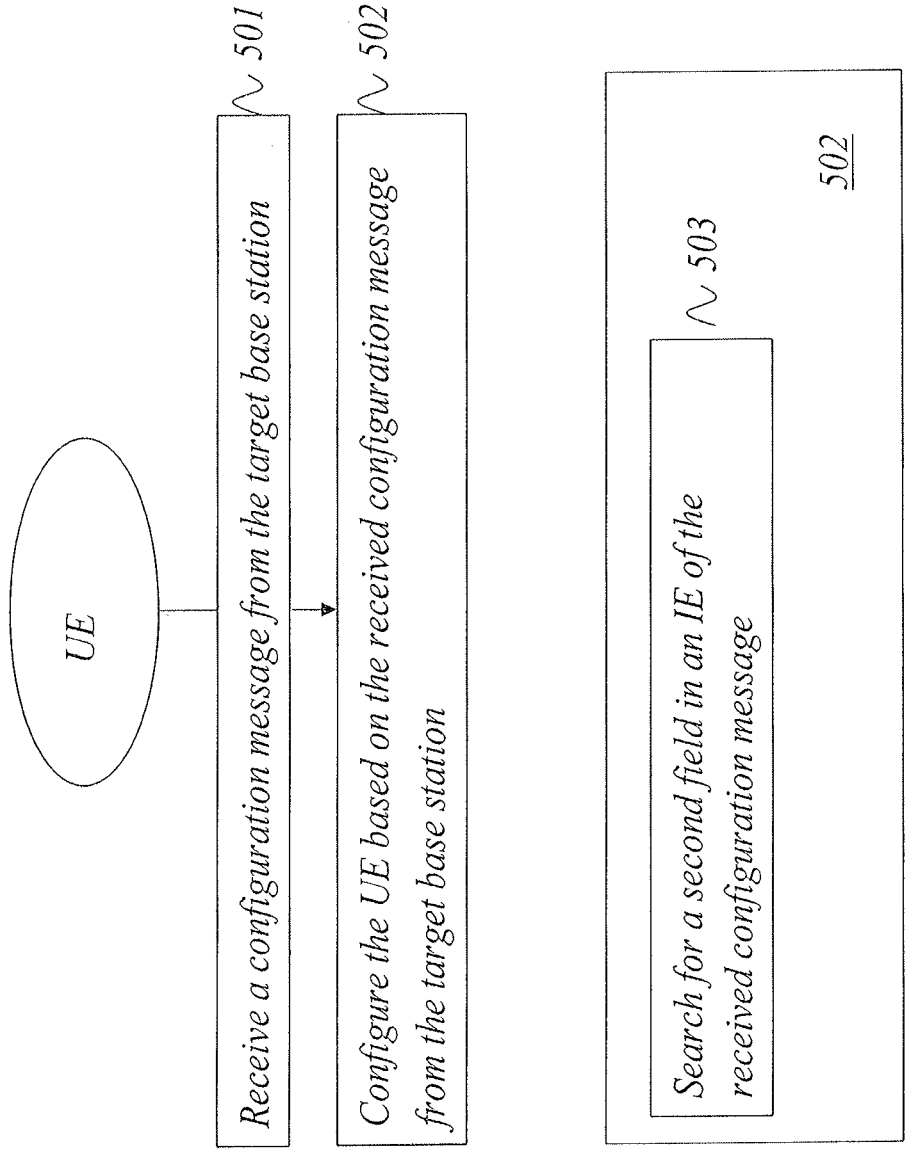

Furthermore, a method in a UE is provided as illustrated in FIG. 5. The UE is configured to be handed over from the source base station to the target base station in a handover scenario and wherein the target base station may not support functionalities, e.g. RRC functionalities, which the source base station and the UE support. The UE receives 501 a configuration message from the target base station via the source base station and configures 502 the UE based on the received configuration message from the target base station. The configuration is performed by searching 503 for a second field in an information element of the received configuration message. The presence/non-presence or a value of the second field is indicative of how to manage a configured first functionality associated with an optional first field, wherein the configured first functionality may not be supported by the target base station.

The value of the second field may be presence or non-presence of a flag, wherein the flag may be a fullConfig flag.

According to embodiments of the present invention, the presence of the second field or the flag indicates to the UE to discontinue using the first functionality and the non-presence of the second field or the flag indicates to the UE to continue using the first functionality. Further, the value of the second field may indicate to the UE the current release which is supported by the target base station and/or the functionalities that the target base station supports.

Figure 6:
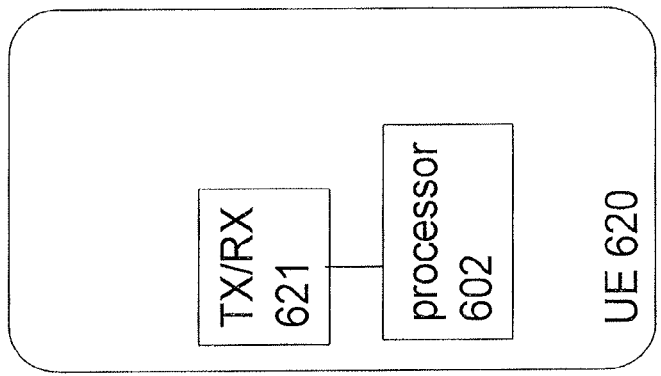
FIG. 6 illustrates arrangements for performing the methods as described in the embodiments of the present invention.
Figure 6:
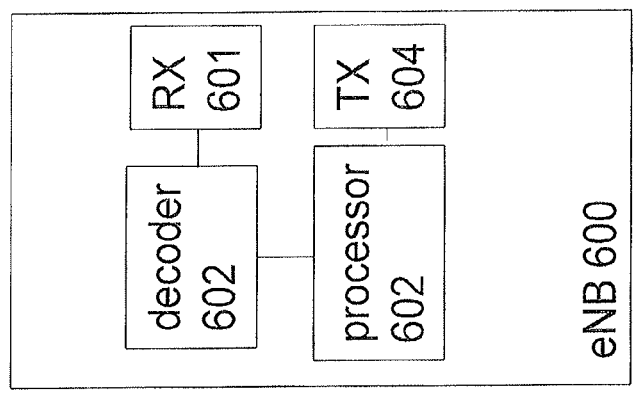
Figure 6:
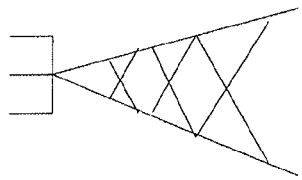

Turning now to FIG. 6 illustrating a base station 600 for configuring a UE 620 in a handover scenario, when the UE 620 is handed over from a source base station to the base station 600. The base station 600 is configured to not support at least one functionality which the source base station and the UE 620 support. The base station 600 comprises a receiver/transmitter and other RF functionality for communicating with UEs the base station is also configured to communicate with other base stations. In addition processing units required for functionalities not relevant for the invention are omitted from the drawings and the specification.

The base station 600 comprises a receiver 601 configured to receive a handover (HO) request message from the source base station comprising at least a first field of an information element associated with a first functionality not supported by the base station. The base station 600 comprises further a decoder 602 configured to decode at least a portion of the received HO request message, depending on if the HO request message is decoded with critical or non-critical extensions to a release of a protocol which the target base station does not support. The base station further comprises a processor 603 configured to compose a reconfiguration message to be used to configure the UE to be handed over to the target base station. Also, the processor 603 is further configured to omit insertion of the at least the first field, and to insert a second field, wherein the second field being indicative of how the UE should be configured in relation to the first functionality. Further the base station comprises a transmitter 604 configured to send the composed reconfiguration message to the UE via the source base station.

Thus the base station according to embodiments of the present invention may be a base station having the functionalities of a LTE release 8 with the addition of the mechanisms provided by the embodiments of the invention as defined above.

As illustrated in FIG. 6, the UE 620 comprises a receiver/transmitter 621 and other RF functionality for communicating with the network. In addition processing units required for functionalities not relevant for the invention are omitted from the drawings and the specification. According to the present invention the UE 620 comprises a receiver configured to receive a configuration message from the target base station via the source base station. A processor 622 in the is configured to search for a second field in an information element of the received configuration message. The presence/non-presence or a value of the second field is indicative of how to manage a configured first functionality associated with an optional first field, wherein the configured first functionality may not be supported by the target base station.

According to an embodiment of the present invention, the processor is configured to interpret the presence of the second field or the flag as to discontinue using the first functionality. Further, the processor may be configured to interpret non-presence of the second field or the flag as to continue using the first functionality.

It should also be noted that the processor may be configured to interpret the value of the second field as the current release which is supported by the target base station and/or the RRC functionalities that the target base station supports.

According to a further alternative to solve the problem associated with networks comprising base station of different releases, the Source eNB may send a handover preparation message to the Target eNB, such that the message includes at least two alternative representations of the Access Stratum Configuration of a UE. The messages are encoded such that the Target eNB can decode at least one of the representations of the Access Stratum Configuration, irrespectively of the release of the Target eNB. Specifically, one of the encoded representations of the Access Stratum Configuration may be encoded according to a first version of the protocol, and another encoded representation of the Access Stratum Configuration may be encoded according to another version of the protocol. The other version of the protocol may now include critical extensions in the message or IE representing the Access Stratum Configuration.

This mechanism of including multiple representations ensures that the Target eNB always receives one representation that it can decode, independently of the release that the Target eNB supports, and critical extensions of the protocol can now be included in IEs describing the AS Context in future releases of the protocol. The Target eNB then selects one of the encoded representations of the Access Stratum Configuration, based on which it encodes a handover command that it sends in an RRCConnectionReconfiguration message.

The UE can then, based on the encoding of the RRCConnectionReconfiguration message or IEs in the message from the target eNB, sent via the source eNB, deduce whether it should apply the first action or the second action in relation to new functionality. Specifically, if the message includes a specific critical extension associated with new functionality, the UE may apply a first action, and if the message does not include a specific critical extension associated with the new functionality, the UE may apply a second action. The first action above may be to continue using new functionality, and the second action may be to stop using new functionality. Thus, by detecting the method of encoding the aforementioned message, the UE can deduce if the transmitting entity, e.g. the Target eNB, supports specific functionality and what actions should be taken based on that.

As explained above, it is proposed to send (at least) two representations of the current UE configuration to the target eNB, one based on a "fall back" version of the protocol, and one critically extended version supporting the full UE configuration. In this specification, LTE Rel-8 is exemplified as the "fall back" version.

However in a future, where for instance LTE Rel-9 and LTE Rel-10 are readily implemented in both the source and the target eNB, it might be desirable not having to send a long range of "fall back" alternatives just because the precise state of the peer is not known. Hence in a further embodiment it is "negotiated" between the source and the target eNBs when establishing the X2 link to determine which version of the protocol to use. This could be realised, e.g., if each node indicates to the other up to which version of the protocol it supports. The two entities provide thus at least one commonly supported version as the "fall back" version. A first eNB may request information the release version supported by a second eNB. Based on the knowledge of the release version of the Target eNB, a Source eNB may now decide to submit an Access Stratum Configuration that the Target comprehends. Still, also with the different embodiments related to the solution of sending information between the eNBs concerning the current UE configuration encoded according to different protocol versions, there is a need for an indication by which the UE decides how to act when optional fields or IEs of a later release protocol are not present in a message.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a user equipment, UE, configured to be handed over from a source base station to a target base station in a handover scenario, and wherein the target base station implements a protocol and functionality specified in a first release and wherein the source base station and the UE implement a later release with additional functionality, the method comprises:
   receiving a configuration message from the target base station via the source base station,
   configuring the UE based on the received configuration message from the target base station by:
      detecting a second field in an information element of the received configuration message, wherein the presence/non-presence of the second field is indicative of how to manage a first functionality associated with an optional first field, wherein the first functionality is an additional functionality implemented in the later release.

2. The method according to claim 1, wherein the value of the second field is presence or non-presence of a flag.

3. The method according to claim 2, wherein the flag is a fullConfig flag.

4. The method according to claim 1, wherein the first functionality is at least one of channel quality indication, CQI, reporting features, timer handling, carrier aggregation, enhanced discontinuous reception, relaying, and coordinated multi-point transmission and reception.

5. The method according to claim 1, wherein the presence of the second field or the flag indicates to the UE to discontinue using the first functionality.

6. The method according to claim 1, wherein the non-presence of the second field or the flag indicates to the UE to continue using the first functionality.

7. The method according to claim 1, wherein the value of the second field indicates to the UE the current release which is supported by the target base station.

8. The method according to claim 1, wherein the value of the second field indicates to the UE the RRC functionalities that the target base station supports.

9. A base station for configuring a user equipment, UE, in a handover scenario, when the UE is handed over from a source base station to the base station and wherein the base station is configured to not support at least one functionality which the source base station and the UE support, the base station comprises:
   a receiver configured to receive from the source base station a handover, HO, request message comprising at least a first field associated with a first functionality not supported by the base station,
   a decoder configured to decode at least a portion of the received HO request message,
   a processor configured to compose a reconfiguration message to be used to configure the UE to be handed over to the base station, wherein the processor is further configured to omit insertion of the at least the first field, and to insert a second field, the second field being indicative of how the UE should be configured in relation to the first functionality, and
   a transmitter for sending the composed reconfiguration message to the UE via the source base station.

10. The base station according claim 9, wherein the indication in the second field how the UE should be configured in relation to the first functionality is adapted to indicate to the UE to discontinue using the first functionality not being supported by the base station.

11. The base station according to claim 9, wherein the indication in the second field how the UE should be configured in relation to the first functionality is adapted to indicate to the UE the current release which is supported by the base station.

12. The base station according to claim 9, wherein the indication in the second field how the UE should be configured in relation to the first functionality is adapted to indicate to the UE functionalities that the base station supports.

13. A user equipment, UE, configured to be handed over from a source base station to a target base station in a handover scenario, and wherein the target base station implements a protocol and functionality specified in a first release and wherein the source base station and the UE implement a later release with additional functionality, the UE comprises:
    a receiver configured to receive a configuration message from the target base station via the source base station,
    a processor configured to search for a second field in an information element of the received configuration message, wherein the presence/non-presence or a value of the second field is indicative of how to manage a first functionality associated with an optional first field, wherein the first functionality may not be supported by the target base station.

14. The UE according to claim 13, wherein the value of the second field is a flag.

15. The UE according to claim 14, wherein the flag is a fullConfig flag.

16. The UE according to claim 13, wherein the processor is configured to interpret the presence of the second field or the flag as to discontinue using the first functionality.

17. The UE according to claim 13, wherein the processor is configured to interpret non-presence of the second field or the flag as to continue using the first functionality.

18. The UE according to claim 13, wherein the processor is configured to interpret the value of the second field as the current release which is supported by the target base station.

19. The UE according to claim 13, wherein the processor is configured to interpret the value of the second field as the functionalities that the target base station supports.

\* \* \* \* \*

UNITED STATES PATENT AND TRADEMARK OFFICE
CERTIFICATE OF CORRECTION

PATENT NO. : 9,924,420 B2  
APPLICATION NO. : 15/384650  
DATED : March 20, 2018  
INVENTOR(S) : Peisa et al.

Page 1 of 2

It is certified that error appears in the above-identified patent and that said Letters Patent is hereby corrected as shown below:

On the Title Page

In Item (72), under "Inventors", in Column 1, Line 4, delete "Kyrkslatt" and insert -- Kyrkslätt --, therefor.

In the Drawings

In Fig. 6, Sheet 6 of 6, delete " 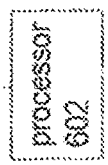 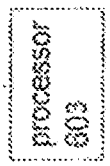 " and insert -- 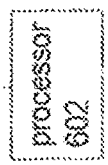 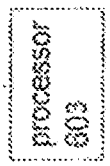 --, therefor.

In Fig. 6, Sheet 6 of 6, delete "  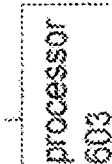 " and insert --  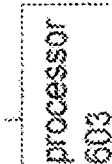 --, therefor.

In the Specification

In Column 1, Line 7, delete "14/607,584" and insert -- 14/607,584, filed Jan 28, 2015, now Pat. No. 9,532,279, --, therefor.

In Column 1, Line 9, delete "2012," and insert -- 2012, now Pat. No. 8,971,891, --, therefor.

In Column 1, Line 32, delete "36,331." and insert -- 36.331. --, therefor.

In Column 1, Line 40, delete "arc" and insert -- are --, therefor.

Signed and Sealed this  
Fifteenth Day of May, 2018

Andrei Iancu  
*Director of the United States Patent and Trademark Office*

CERTIFICATE OF CORRECTION (continued)
U.S. Pat. No. 9,924,420 B2

In Column 2, Line 6, delete "cqi_ReportModeAperiodic" and insert -- cqi-ReportModeAperiodic --, therefor.

In Column 7, Line 47, delete "RRC Connection reconfiguration" and insert -- RRCConnectionReconfiguration --, therefor.

In Column 7, Line 51, delete "cNB." and insert -- eNB --, therefor.

In Column 8, Line 4, delete "field.;" and insert -- field; --, therefor.

In Column 8, Line 5, delete "eNB," and insert -- eNB --, therefor.

In Column 10, Line 35, delete "processor 622 in the is" and insert -- processor 603 is --, therefor.

In the Claims

In Column 12, Line 61, in Claim 10, delete "according" and insert -- according to --, therefor.